United States Patent
Smith, II et al.

(10) Patent No.: US 8,883,916 B2
(45) Date of Patent: *Nov. 11, 2014

(54) RELEASE ON DEMAND CORROSION INHIBITOR COMPOSITION

(75) Inventors: Thomas S. Smith, II, Novi, MI (US); Brian D. Bammel, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 261 days.

This patent is subject to a terminal disclaimer.

(21) Appl. No.: 12/993,527

(22) PCT Filed: May 19, 2009

(86) PCT No.: PCT/US2009/044457
§ 371 (c)(1),
(2), (4) Date: Jan. 11, 2011

(87) PCT Pub. No.: WO2009/143110
PCT Pub. Date: Nov. 26, 2009

(65) Prior Publication Data
US 2011/0111237 A1    May 12, 2011

Related U.S. Application Data

(60) Provisional application No. 61/054,360, filed on May 19, 2008.

(51) Int. Cl.
*C09D 133/14*  (2006.01)
*C08F 8/30*    (2006.01)
*C23F 11/00*   (2006.01)

(52) U.S. Cl.
CPC ............... *C08F 8/30* (2013.01); *C08F 2800/20* (2013.01); *C08F 2810/20* (2013.01)
USPC ...... 524/592; 252/389.54; 252/390; 524/408; 524/413; 525/154; 525/379; 427/388.1

(58) Field of Classification Search
None
See application file for complete search history.

(56) References Cited

U.S. PATENT DOCUMENTS 4,194,063 A * 3/1980 Frank et al. ............... 435/12
4,908,398 A * 3/1990 Li Bassi et al. ............ 524/99

(Continued)

FOREIGN PATENT DOCUMENTS

CN  1301883 A  7/2001
EP  0581466 A2  2/1994

OTHER PUBLICATIONS

International Search Report, Dated Jul. 17, 2009, 3 Pages.
Eastman, Waterborne Acrylic Emulsion Formulation Using Eastman Acetoacetoxyethyl Methacrylate, 2013 5 Pages.

*Primary Examiner* — Callie Shosho
*Assistant Examiner* — Daniel D Lowrey
(74) *Attorney, Agent, or Firm* — Mary K. Cameron

(57) ABSTRACT

Disclosed is cross-linking process for cross-linking polymeric chains in a coating composition. In one embodiment the process utilizes a Hantzsch dihydropyridine reaction to form reaction products including cross-linking polymeric resin chains having beta-keto ester functions using a source of aldehyde and a source of ammonia or a primary amine to form a permanent dihydropyridine bond between the beta-keto ester functions. The novel cross-linking reaction can occur at lower temperatures compared to typical cross-linking reactions and can occur in aqueous solutions that have a neutral to mildly alkaline pH of from 6 to 11. The novel cross-linking reaction provides many advantages to performing cross-linking of polymeric chains in coating resins.

14 Claims, 1 Drawing Sheet

(56) References Cited

U.S. PATENT DOCUMENTS

| | | | |
|---|---|---|---|
| 5,527,848 A * | 6/1996 | Carpenter et al. | 524/403 |
| 5,767,199 A * | 6/1998 | Bors et al. | 525/153 |
| 6,117,492 A * | 9/2000 | Goldstein et al. | 427/391 |
| 6,586,516 B1 * | 7/2003 | Kesselmayer et al. | 524/475 |
| 6,736,908 B2 * | 5/2004 | Sako et al. | 148/25 |
| 7,470,751 B2 * | 12/2008 | Taylor et al. | 525/370 |
| 8,241,524 B2 * | 8/2012 | McGee et al. | 252/389.54 |

* cited by examiner

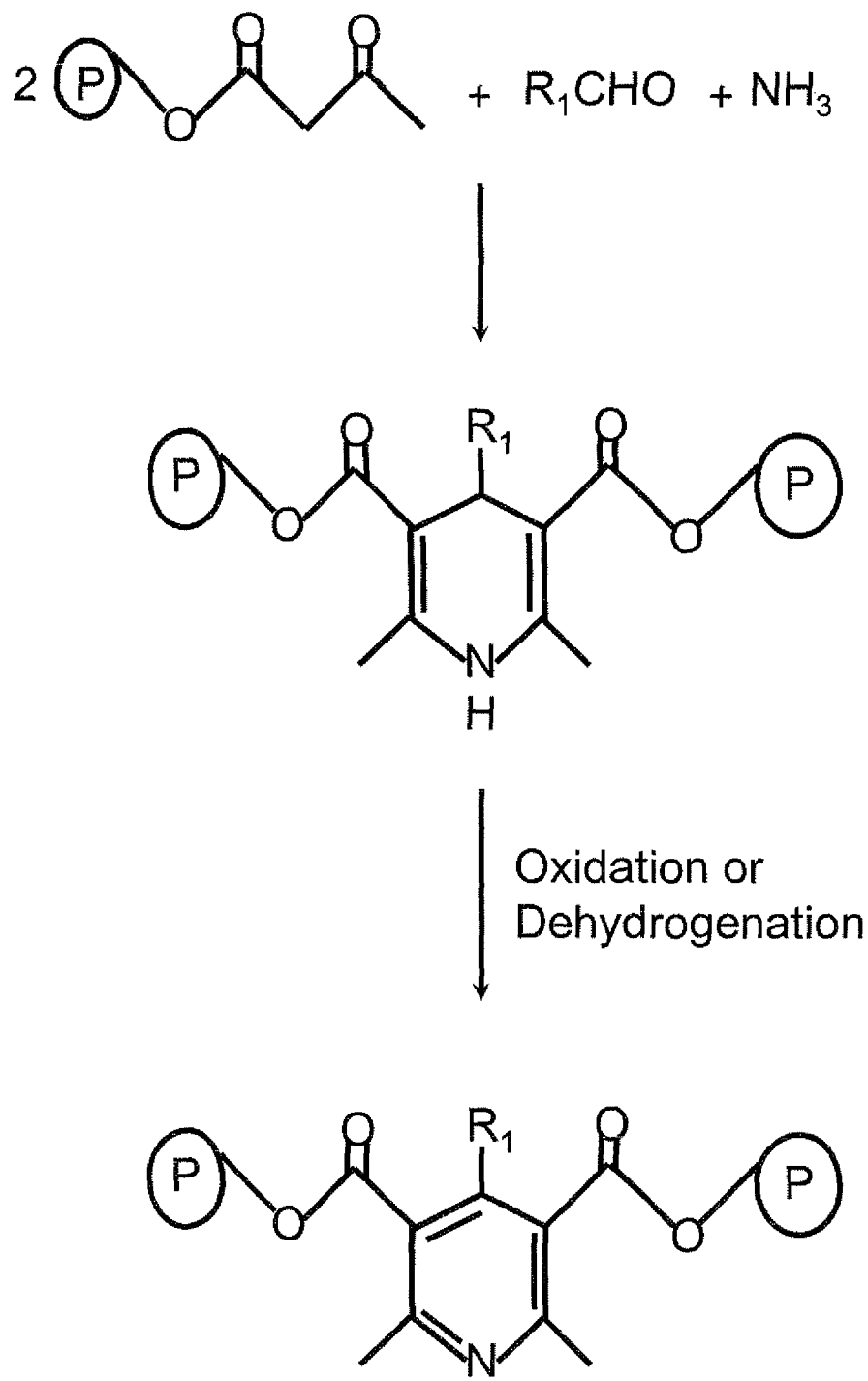

RELEASE ON DEMAND CORROSION INHIBITOR COMPOSITION

RELATED APPLICATIONS

This U.S. National Stage patent application claims the benefit of International Application No. PCT/US2009/044457 filed May 19, 2009, which claims the benefit of U.S. Provisional Application No. 61/054,360 filed on May 19, 2008, the entire disclosures of the applications being considered part of the disclosure of this application, and hereby incorporated by reference.

STATEMENT REGARDING FEDERALLY SPONSORED RESEARCH

NONE

TECHNICAL FIELD

This invention relates generally to cross-linking reactions in organic coating resins and, more particularly, to cross-linking reactions based on the Hantzsch dihydropyridine synthesis reaction.

BACKGROUND OF THE INVENTION

Cross-linking reactions for cross-linking coating resins are known in the art. Cross-linking can enhance the properties of coated substrates. These properties include mechanical, physical, aesthetic, and corrosion resistance. One difficulty with current cross-linking reactions is that they often require high processing temperatures which limits their usefulness for certain substrates. In addition, many of the cross-linking reactions require non-aqueous solutions or are reversible, which presents performance problems.

It is desirable to develop a cross-linking process and system that can be utilized at lower reaction temperatures. In addition, it would be desirable to develop cross-linking processes that can occur in aqueous systems and that are irreversible.

SUMMARY OF THE INVENTION

In general terms, this invention provides a cross-linking reaction process and system that operates at lower temperatures in aqueous systems and that is irreversible. The process relies on a method for formation of Hantzsch Dihydropyridines as the cross-linking group. In one embodiment the system uses two equivalents of beta-keto esters on the resin, such as those provided by acetoacetoxyethyl methacrylate, one equivalent of aldehyde and one equivalent of ammonia or a primary amine to produce a Hantzsch Dihydropyridine.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 1 is a schematic of the proposed Hantzsch Dihydropyridine cross-linking mechanism according to the present invention.

DETAILED DESCRIPTION OF A PREFERRED EMBODIMENT

The present invention is directed toward a cross-linking mechanism for cross-linking adjacent polymer chains in a coating resin. Cross-linking reactions have been utilized in the past for coating resins, however they suffer from a need for high heat of reaction, need for harsh conditions, non-aqueous systems, or reversibility. The present invention provides for a cross-linking reaction that operates at low temperatures relative to other cross-linking reactions, occurs in aqueous solutions, and is irreversible. The present cross-linking reaction improves the chemical properties, mechanical properties, barrier properties, physical properties and corrosion resistance of the coating resin. The present reaction can be used to cause cross-linking in thin organic coatings, organic coatings, passivate rinses, sealing rinses, adhesives, and sealants, by way of example. The present invention is directed toward treatment of bare metal surfaces meaning that the metal surface has not been pre-treated with any metal phosphate solutions, chrome-containing rinses, or any other passivating treatments. Metal surfaces that benefit from the process of the present invention include steel, cold rolled steel, hot rolled steel, stainless steel, aluminum, steel coated with zinc metal or zinc alloys such as electrogalvanized steel, Galvalume®, galvanneal, and hot-dipped galvanized steel.

Preferably, the metal surface has been cleaned and degreased prior to treatment according to the present invention. Cleaning of metal surfaces is well known in the art and can include mild or strongly alkaline cleaners. Examples of two alkaline cleaners include Parco® Cleaner ZX-1 and Parco® Cleaner 315 both available from Henkel Surface Technologies. Following cleaning the surface is preferably rinsed with water prior to treatment according to the present invention.

The proposed reaction scheme for the present invention is shown in FIG. 1. The Hantzsch dihydropyridine/pyridine synthesis reaction allows the preparation of a dihydropyridine derivative by a condensation reaction of an aldehyde with two equivalents of a beta-keto ester, such as provided by the pendant chains after incorporation of acetoacetoxyethyl methacrylate into the resin, in the presence of ammonia or a primary amine. A subsequent oxidation or dehydrogenation leads to a pyridine 3,5-dicarboxylate.

Ammonia or a variety of primary amines are useful in present invention. Examples include ammonia, amino acids, diamines, and other molecules with primary amine groups. It has been found that the amine levels can be very high, far in excess of the number of beta-keto ester groups on the resin without interfering with the Hantzsch Dihydropyridine reaction.

A variety of aldehydes may be used in the present invention including, only by way of example, formaldehyde, salicylaldehyde, cinnamaldehyde, glucose, vanillin, glyoxal, and glyoxylic acid. Preferably the amount of aldehyde is closely tailored to the level of resin beta-keto ester sites. Preferably, the cross-linking solution includes from 0.1 to 1.5 equivalents of aldehyde per 2 equivalents of beta-keto ester groups on the resin, more preferably from 0.5 to 1.1 aldehyde equivalents per 2 equivalents of beta-keto ester groups on the resin.

A series of resins were prepared having as the pendent chains with beta-keto ester functions acetoacetoxyethyl methacrylate (AAEM). This is just one of the possible pendant chains that could be used in the process of the present invention.

Coating Resin Example 1 (3272-096)

An organic coating resin was prepared as described below, it is designated as resin 3272-096. The resin includes as monomers: acetoacetoxyethyl methacrylate (AAEM), n-butyl methacrylate, styrene, methyl methacrylate, 2-ethylhexyl acrylate, and ADD APT PolySurf HP which is a mixture of methacrylated mono and di-phosphate ester. Another potential source for phosphates in all resins prepared according to the present invention is Ebecryl 168 from Radcure Corporation. The total monomer distribution in the resin was as follows: 20.00% AAEM, 12.50% n-butyl methacrylate, 15.00% styrene, 27.50% methyl methacrylate, 20.00% 2-ethylhexyl acrylate, and 5.00% ADD APT PolySurf HP. The resin polymerization reaction was run under $N_2$ with stirring and a heat set point of 80° C. The initial charge to the reaction vessel was 241.10 grams of deionized (DI) water, 2.62 grams of ammonium lauryl sulfate (Rhodapon L-22 EP), and 2.39 grams of ferrous sulfate 0.5% $FeSO_4 7H_2O$ (3 ppm). This initial charge was put into the reaction vessel at time zero and heating to the set point was begun. After 30 minutes a reactor seed comprising a combination of 5.73 grams of DI water, 0.90 grams of non-ionic surfactant Tergitol 15-S-20, 0.13 grams of Rhodapon L-22 EP, 2.15 grams of n-butyl methacrylate, 2.57 grams of styrene, 4.74 grams of methyl methacrylate, 3.48 grams of 2-ethylhexyl acrylate, 3.41 grams of acetoacetoxyethyl methacrylate (AAEM), and 0.85 grams of ADD APT PolySurf HP was added to the reaction vessel and heating to the set point was continued for another 15 minutes. Then an initial initiator charge was added to the vessel comprising 0.32 grams of $HOCH_2SO_2Na$, 4.68 grams of DI water, 0.45 grams of tert-butylhydroperoxide, and an additional 4.54 grains of DI water and the temperature was maintained at the set point for another 30 minutes. Then the monomer and initiator co-feeds were added to the vessel over a three hour period with the temperature maintained at the set point. The monomer co-feed was 106.92 grams of DI water, 17.10 grams of Tergitol 15-S-20, 2.49 grams of Rhodapon L-22 EP, 40.89 grams of n-butyl methacrylate, 48.83 grams of styrene, 89.97 grams of methyl methacrylate, 66.10 grams of 2-ethylhexyl acrylate, 64.77 grams of AAEM, and 16.19 grains of ADD APT PolySurf HP. The initiator co-feed was 0.97 grams of $HOCH_2SO_2Na$, 14.03 grams of DI water, 1.39 grams of tert-butylhydroperoxide, and an additional 13.61 grains of DI water. After the three hours a chaser charge was added to the vessel over a 30 minute period. The chaser charge was 0.32 grams of $HOCH_2SO_2Na$, 4.88 grams of DI water, 0.46 grams of tert-butylhydroperoxide, and an additional 4.54 grams of DI water. The vessel was then held at the set point for one hour and 30 minutes. Then the cool down from the set point was begun and continued for 2 hours until the temperature was 38° C. Then the buffer co-feed was added to the vessel. The buffer co-feed was 5.19 grams of ammonium hydroxide (28%) and 18.48 grams of DI water. Additional non-ionic surfactant stabilizers that could be used in place of Tergitol 15-S-20, which is a secondary alcohol ethoxylate, in this resin and all resins in accordance with the present invention are other non-ionic stabilizers having a hydrophilic lipophilic balance of from 15 to 18. Examples of these stabilizers include: other secondary alcohol ethoxylates such as Tergitol 15-S-15; blends of ethoxylates such as Abex 2515; alkyl polyglycol ether such as Emulsogen LCN 118 or 258; tallow fatty alcohol ethoxylate such as Genapol T 200 and T 250; isotridecyl alcohol ethoxylates such as Genapol X 158 and X 250; tridecyl alcohol ethoxylates such as Rhodasurf BC-840; and oleyl alcohol ethoxylates such as Rhoadsurf ON-877.

Coating Resin Example 2 (3272-103)

An organic coating resin was prepared as described below, it is designated as resin 3272-103. The resin includes as monomers: acetoacetoxyethyl methacrylate (AAEM), n-butyl methacrylate, styrene, methyl methacrylate, 2-ethylhexyl acrylate, and ADD APT PolySurf HP which is a mixture of methacrylated mono and di-phosphate ester. The total monomer distribution in the resin was as follows: 20.00% AAEM, 12.50% n-butyl methacrylate, 15.00% styrene, 27.50% methyl methacrylate, 20.00% 2-ethylhexyl acrylate, and 5.00% ADD APT PolySurf HP. The resin polymerization reaction was run under $N_2$ with stirring and a heat set point of 80° C. The initial charge to the reaction vessel was 286.10 grams of DI water, 2.47 grams of Rhodapon L-22 EP. This initial charge was put into the reaction vessel at time zero and heating to the set point was begun. After 30 minutes a reactor seed comprising a combination of 5.44 grams of DI water, 0.85 grams of Tergitol 15-S-20, 0.12 grams of Rhodapon L-22 EP, 2.04 grams of n-butyl methacrylate, 2.44 grams of styrene, 4.49 grams of methyl methacrylate, 3.30 grams of 2-ethylhexyl acrylate, 3.24 grams of acetoacetoxyethyl methacrylate (AAEM), and 0.81 grams of ADD APT PolySurf HP was added to the reaction vessel and heating to the set point was continued for another 15 minutes. Then an initial initiator charge was added to the vessel comprising 4.79 grams of DI water and 0.21 grams of $(NH_4)_2S_2O_8$ and the temperature was maintained at 80° C. for another 30 minutes. Then the monomer and initiator co-feeds were added to the vessel over a three hour period with the temperature maintained at the set point. The monomer co-feed was 103.36 grams of DI water, 16.15 grams of Tergitol 15-S-20, 2.35 grams of Rhodapon L-22 EP, 38.81 grams of n-butyl methacrylate, 46.34 grams of styrene, 85.38 grams of methyl methacrylate, 62.73 grams of 2-ethylhexyl acrylate, 61.47 grams of AAEM, and 15.37 grams of ADD APT PolySurf HP. The initiator co-feed was 14.36 grams of DI water and 0.64 grams of $(NH_4)_2S_2O_8$. After the three hours a chaser charge was added to the vessel over a 30 minute period. The chaser charge was 0.35 grams of ascorbic acid, 4.65 grams of DI water, 0.44 grains of tert-butylhydroperoxide, an additional 4.56 grams of DI water, and 2.39 grams of ferrous sulfate 0.5% $FeSO_4 7H_2O$ (3 ppm). The vessel was then held at the set point for one hour and 30 minutes. Then the cool down was begun and continued for 2 hours until the temperature was 38° C. Then the buffer co-feed was added to the vessel. The buffer co-feed was 5.88 grams of ammonium hydroxide (28%) and 18.48 grams of DI water.

Coating Resin Example 3 (3272-056)

An organic coating resin was prepared as described below, it is designated as resin 3272-056. The resin includes as monomers: acetoacetoxyethyl methacrylate (AAEM), n-butyl methacrylate, styrene, methyl methacrylate, 2-ethylhexyl acrylate, and ADD APT PolySurf HP which is a mixture of methacrylated mono and di-phosphate ester. The total monomer distribution in the resin was as follows: 20.00% AAEM, 12.50% n-butyl methacrylate, 15.00% styrene, 27.50% methyl methacrylate, 20.00% 2-ethylhexyl acrylate, and 5.00% ADD APT PolySurf HP. The resin polymerization reaction was run under $N_2$ with stirring and a heat set point of 70° C. The initial reactor charge was 241.01 grams of DI water, and 2.62 grams of Rhodapon L-22 EP (ammonium lauryl sulfate). The second reactor charge was 2.39 grams of ferrous sulfate 0.5% $FeSO_4 7H_2O$ (3 ppm). The two initiator co-feeds were 1.62 grams of $HOCH_2SO_2Na$ in 23.38 grams of DI water and 2.31 grams of tert-butylhydroperoxide in 22.69 grams of DI water. The monomer co-feed was 114.41 grams of DI water, 18.00 grams of Tergitol 15-S-20 (secondary alcohol ethoxylate surfactant), 2.62 grams of Rhodapon L-22 EP, 68.18 grams of AAEM, 43.05 grams of n-butyl methacrylate, 51.39 grams of styrene, 94.70 grams of methyl methacrylate, 69.58 grams of 2-ethylhexyl acrylate, and 17.05 grams of ADD APT PolySurf HP. The neutralizer charge was 6.52 grams of 28% ammonium hydroxide in 18.48 grams of DI water. The process commenced with adding the initial reactor charge to the reaction vessel with stirring for 30 minutes. Then 25 grams of the monomer co-feed was added to the reaction vessel as a seed along with 4 milliliters of each initiator co-feed and the second reactor charge. Then the monomer co-feed was fed into the reaction vessel over a 3 hour period and the initiator co-feeds were fed into the reaction vessel over a 4 hour period. After the final addition of the initiator co-feeds the reaction was run for an additional 40 minutes and then cool down to 38° C. was begun. After 1 hour and 45 minutes of cool down the neutralizer charge was added to the reaction vessel.

In a first test two coating compositions were prepared to determine if the Hantzsch dihydropyridine reaction could take place in a resin coating composition. The test involved use of resin 3272-096 and either vanillin or salicylaldehyde as the aldehyde source for the reaction. The required amine for the reaction is provided by the Bacote 20® which has a great excess of ammonium to serve as the amine in the reaction. Bacote 20® is one preferred source of ammonium zirconyl carbonate and is available from MEI in Flemington, N.J. It provides approximately 20% w/w of $ZrO_2$. The two test formulas are provided in Table 1 below. The formula with vanillin did not result in any visual indication of a reaction, however, the formula with salicylaldehyde began turning yellow in color indicating a reaction was occurring that resulted in formation of a carbon to nitrogen bond. These results suggest that a Hantzsch dihydropyridine reaction is possible in the formulas and that the identity of the aldehyde source may influence the reaction.

TABLE 1

| Component | Coating 1 | Coating 2 |
|---|---|---|
| DI water | 65.5 | 65.5 |
| ammonium zirconyl carbonate (Bacote 20 ®) | 24.0 | 24.0 |
| Resin 3272-096 | 10.0 | 10.0 |
| vanillin | 0.5 | |
| salicylaldehyde | | 0.5 |

In the next series of experiments a series of coating compositions were created using the coating resins described above. The coating compositions were prepared as described below in Table 2 and Table 3 with the amounts of each component given in weight percentage. In the coating solutions the source of the aldehyde was varied, amine for the Hantzsch dihydropyridine reaction is provide by the excess ammonia in the Bacote 20®. In addition, amine can be provided by the cysteine. Optionally, the coatings of the present invention can also include processing aids such as waxes which aid in formability of the coated substrates.

TABLE 2

| Component | 9A | 9B | 9C | 9D | 9E | 9F | 9G |
|---|---|---|---|---|---|---|---|
| DI Water | 65.00 | 64.74 | 64.72 | 64.62 | 64.68 | 64.69 | 64.69 |
| Bacote 20 ® | 24.00 | 24.00 | 24.00 | 24.00 | 24.00 | 24.00 | 24.00 |
| $V_2O_5$ | 0.50 | 0.50 | 0.50 | 0.50 | 0.50 | 0.50 | 0.50 |
| Cysteine | 0.50 | 0.50 | 0.50 | 0.50 | 0.50 | 0.50 | 0.50 |
| 3272-096 | 10.00 | 10.00 | 10.00 | 10.00 | 10.00 | 10.00 | 10.00 |
| Salicylaldehyde | | 0.26 | | | | | |
| Cinnamaldehyde | | | 0.28 | | | | |
| Glucose | | | | 0.38 | | | |
| Vanillin | | | | | 0.32 | | |
| 40% Glyoxal | | | | | | 0.31 | |
| 50% Glyoxylic acid | | | | | | | 0.31 |

TABLE 3

| Component | 9H | 9I | 9J | 9K | 9L | 9M | 9N |
|---|---|---|---|---|---|---|---|
| DI Water | 65.00 | 64.76 | 64.74 | 64.64 | 64.70 | 64.71 | 64.71 |
| Bacote 20 ® | 24.00 | 24.00 | 24.00 | 24.00 | 24.00 | 24.00 | 24.00 |
| $V_2O_5$ | 0.50 | 0.50 | 0.50 | 0.50 | 0.50 | 0.50 | 0.50 |
| Cysteine | 0.50 | 0.50 | 0.50 | 0.50 | 0.50 | 0.50 | 0.50 |
| 3272-103 | 10.00 | 10.00 | 10.00 | 10.00 | 10.00 | 10.00 | 10.00 |
| Salicylaldehyde | | 0.24 | | | | | |
| Cinnamaldehyde | | | 0.26 | | | | |
| Glucose | | | | 0.36 | | | |
| Vanillin | | | | | 0.30 | | |
| 40% Glyoxal | | | | | | 0.29 | |
| 50% Glyoxylic acid | | | | | | | 0.29 |

The prepared coating compositions described in Table 2 and Table 3 were then coated onto a series of hot dip galvanized (HDG) panels ACT HDG APR 31893 for testing of the corrosion resistance of the coatings in neutral salt spray (NSS) testing using ASTM B117. The test panels were coated with the formulas from Tables 2 and Table 3 in a dry in place process as known to those of skill in the art. The coatings were applied at a coating weight of approximately 200 milligrams per square foot (200 milligrams per 929.03 square centimeters) to each panel and then dried to a peak metal temperature of either 200° F. (93° C.) or 300° F. (149° C.) and either put directly into the NSS test or first washed with the alkaline cleaner PC1 338 and then put in to the NSS test. A drop in NSS results after pre-treatment with PC1 338 would indicate that the coatings are not alkaline resistant. The coated panels were then tested for corrosion resistance using NSS according to ASTM B117. For each time point multiples of each condition were examined and the percentage of the total surface corroded was determined, averaged and reported below.

The results in Table 4 are from panels that were dried to a peak metal temperature of 200° F. (93° C.) with no treatment with PC1 338. The controls, formulas 9A and 9H, did not include any exogenously added aldehyde for the Hantzsch dihydropyridine reaction. The best results were seen with glucose as the aldehyde source in formula 9D which showed corrosion resistance that was much higher than the other formulas. Good results were also seen in formulas 9J and 9K.

TABLE 4

| Formula | 24 hr | 48 hr | 72 hr | 96 hr | 168 hr | 336 hr | 504 hr |
|---|---|---|---|---|---|---|---|
| 9A | 0 | 3.7 | 8.7 | 11.3 | 50 | | |
| 9B | 1 | 34.3 | 72 | 76.7 | 93.3 | | |
| 9C | 0 | 7 | 10 | 25.3 | 50 | | |
| 9D | 0 | 1 | 1 | 3 | 7 | 33.3 | 80 |
| 9E | 0 | 7 | 10 | 30 | 60 | | |
| 9F | 0 | 7 | 7 | 16 | 70 | | |
| 9G | 0 | 5.3 | 6.7 | 17.3 | 39 | 60 | 90 |
| 9H | 0 | 1 | 1 | 4.3 | 33.3 | 76.7 | |
| 9I | 0 | 30 | 50 | | | | |
| 9J | 0 | 0.3 | 1.3 | 3 | 19 | | |
| 9K | 0 | 1 | 1 | 5.3 | 24.3 | 70 | |
| 9L | 0 | 3 | 9 | 15.7 | 38.7 | 93.3 | |

TABLE 4-continued

| Formula | 24 hr | 48 hr | 72 hr | 96 hr | 168 hr | 336 hr | 504 hr |
|---|---|---|---|---|---|---|---|
| 9M | 0 | 25 | 30 | 40 | 50 | | |
| 9N | 0 | 4.3 | 7 | 18.7 | 60 | | |

The results in Table 5 are from panels that were dried to a peak metal temperature of 300° F. (149° C.) with no pre-treatment with PCl 338. The controls, formulas 9A and 9H, did not include any exogenously added aldehyde for the Hantzsch dihydropyridine reaction. The results show that for virtually all formulas increasing the PMT to 300° F. (149° C.) resulted in worse performance in the NSS test or no improvement. At these higher PMT conditions the best corrosion resistance was seen in formulas 9D and 9G.

TABLE 5

| Formula | 24 hr | 48 hr | 72 hr | 96 hr | 168 hr | 336 hr |
|---|---|---|---|---|---|---|
| 9A | 0 | 0 | 0 | 1.7 | 50 | |
| 9B | 50 | | | | | |
| 9C | 0 | 7 | 11 | 30 | 50 | |
| 9D | 0 | 3 | 3 | 4.3 | 43.3 | |
| 9E | 0 | 20.7 | 50 | | | |
| 9F | 0 | 6 | 50 | | | |
| 9G | 0 | 9.7 | 6.7 | 11.7 | 36.7 | 60 |
| 9H | 0 | 1 | 18.7 | 40 | 65.3 | 93.3 |
| 9I | 0 | 50 | | | | |
| 9J | 0 | 10 | 30 | 40 | 50 | |
| 9K | 0 | 30 | 50 | | | |
| 9L | 0 | 20 | 50 | | | |
| 9M | 0 | 50 | | | | |
| 9N | 0 | 10 | 10 | 16 | 50 | |

The results in Table 6 are from panels that were dried to a peak metal temperature of 200° F. (93° C.) followed by pre-treatment with PCl 338 prior to the NSS test. The controls, formulas 9A and 9H, did not include any exogenously added aldehyde for the Hantzsch dihydropyridine reaction. The results for the formulas 9A to 9N all were worse after the PCl 338 pre-treatment indicating that the coatings are not alkaline resistant,

TABLE 6

| Formula | 24 hr | 48 hr | 72 hr | 96 hr | 168 hr |
|---|---|---|---|---|---|
| 9A | 7 | 50 | 50 | 50 | 50 |
| 9B | 30 | 50 | | | |
| 9C | 3 | 50 | | | |
| 9D | 5 | 50 | | | |
| 9E | 3 | 50 | | | |
| 9F | 3 | 50 | | | |
| 9G | 0 | 3 | 10 | 50 | |
| 9H | 3 | 30 | 50 | | |
| 9I | 7 | 50 | 50 | | |
| 9J | 0 | 7 | 16 | 25 | 50 |
| 9K | 0 | 20 | 50 | | |
| 9L | 3 | 30 | 50 | | |
| 9M | 20 | 50 | | | |
| 9N | 0 | 40 | | | |

The results in Table 7 are from panels that were dried to a peak metal temperature of 300° F. (149° C.) followed by pre-treatment with PCl 338 prior to the NSS test. The controls, formulas 9A and 9H, did not include any exogenously added aldehyde for the Hantzsch dihydropyridine reaction. For the formulas 9A to 9N the effect of PCl 338 pre-treatment was to generally reduce the corrosion resistance. Some formulas showed no change, but most were negatively effected by the pre-treatment.

TABLE 7

| Formula | 24 hr | 48 hr | 72 hr | 96 hr | 168 hr |
|---|---|---|---|---|---|
| 9A | 3 | 10 | 80 | | |
| 9B | 50 | 50 | | | |
| 9C | 3 | 50 | | | |
| 9D | 3 | 60 | | | |
| 9E | 10 | 50 | | | |
| 9F | 7 | 20 | 80 | | |
| 9G | 0 | 16 | 50 | | |
| 9H | 0 | 20 | 50 | | |
| 9I | 16 | 50 | | | |
| 9J | 1 | 30 | 50 | 40 | 50 |
| 9K | 0 | 30 | 50 | | |
| 9L | 10 | 50 | 50 | | |
| 9M | 7 | 50 | | | |
| 9N | 0 | 30 | 50 | | |

In another series of experiments these formulas and peak metal temperatures were tested on HDG panels to determine their solvent resistance to methylethyl ketone (MEK). The test was performed as known to those in the art. Briefly, coated test panels were rubbed by machine with a pad coated in the MEK for set period of time and then graded for appearance. The results are presented in Table 8 below, with a level 1 being the worst appearance and 10 being the best. Control panels for formula 9N were prepared using acetic, acid, which provides no aldehyde function, in place of the 50% glyoxylic acid at a PMT of 200° F. (93° C.). This control produced an appearance level of 5. The formulas 9A to 9N seemed to benefit from the higher PMT of 300° F. (149° C.) almost across the board. Again best results were seen with either salicylaldehyde, cinnamaldehyde, glucose, or glyoxylic acid.

TABLE 8

| Formula | HGD PMT 200° F. (93° C.) | HDG 300° F. (149° C.) |
|---|---|---|
| 9A | 6 | 8 |
| 9B | 4 | 8 |
| 9C | 9 | 9 |
| 9D | 5 | 8 |
| 9E | 4 | 5 |
| 9F | 8 | 9 |
| 9G | 8 | 10 |
| 9H | 9 | 9 |
| 9I | 9 | 7 |
| 9J | 8 | 9 |
| 9K | 9 | 9 |
| 9L | 5 | 9 |
| 9M | 7 | 7 |
| 9N | 9 | 9 |

In a final series of experiments the effect of PMT on alkaline resistance of the coatings was determined. For this experiment panels were created using the following coating formula: 65.00% DI water, 24.00% Bacote 20, 0.50% $V_2O_5$, 10.00% resin 3272-056, and 0.5% Cysteine. In this coating the aldehyde is coming from the sodium formaldehyde sulfoxalate initiator used to form the resin 3272-056. The coated panels were coated with approximately 200 milligrams per square foot (200 milligrams per 929.03 square centimeters) and then dried to PMT of 200, 250, 300, or 350° F. (93, 121, 149, or 177° C.). The alkaline treatment was as follows: a portion of each panel was dipped into a 20% NaOH solution for approximately 1 to 2 minutes and then removed for visual evaluation. The results showed that using PMT of 200 or 250° F. (93 or 121° C.) provided no resistance to alkaline dip, in fact, the dip removed the entire coating down to bare metal.

By way of contrast PMT of 300 or 350° F. (149 or 177° C.) provided complete resistance to the alkaline treatment. This indicates that the Hantzsch Dihydropyridine reaction may require PMT of from 250 to 300° F. (121 to 149° C.) for completion using this formulation.

Coatings prepared according to the present invention are designed to be applied directly to bare metal substrates without the need for any phosphate or other pre-treatments other than cleaning. They can be applied at any desired coating weight required by the situation, preferably they are applied at a coating weight of from 150 to 400 milligrams per square foot (150 to 400 milligrams per 929.03 square centimeters), more preferably at from 175 to 300 milligrams per square foot (175 to 300 milligrams per 929.03 square centimeters) and most preferably at from 175 to 250 milligrams per square foot (175 to 250 milligrams per 929.03 square centimeters). The coatings of the present invention are dry in place coatings as known in the art and are preferably dried to a peak metal temperature of from 180 to 350° F. (82 to 177° C.), more preferably to a PMT of from 200 to 325° F. (93 to 163° C.).

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An aqueous coating composition comprising: reaction products of a polymeric resin containing pendant beta-keto ester functions with an aldehyde and a source of either ammonia or a primary amine; wherein said polymeric resin comprises a plurality of polymeric chains and wherein each of said polymeric chains contains at least one of said pendant beta-keto ester functions; wherein said aldehyde is selected from the group consisting of formaldehyde, salicylaldehyde, cinnamaldehyde, vanillin, glyoxal, glyoxylic acid, and mixtures thereof; and wherein a portion of said polymeric chains are cross-linked to each other by a Hantzsch dihydropyridine reaction between two equivalents of said beta-keto ester functions, each of said beta-keto ester functions on a different polymeric chain, one equivalent of said aldehyde and one equivalent of said ammonia or said primary amine, thereby forming a plurality of polymeric chains each crosslinked to another polymeric chain by a Hantzsch dihydropyridine reaction.

2. The aqueous coating composition as recited in claim 1, further comprising a wax.

3. The aqueous coating composition as recited in claim 1, comprising from 0.1 to 1.5 equivalents of said aldehyde groups per each 2 equivalents of beta-keto ester functions on said resin.

4. The aqueous coating composition as recited in claim 1, wherein said beta-keto ester functions are provided by incorporation of acetoacetoxyethyl methacrylate into said polymeric resin.

5. The aqueous coating composition as recited in claim 1, wherein said aldehyde further comprises.

6. The aqueous coating composition as recited in claim 1, wherein said source of primary amine comprises an amino acid.

7. The aqueous coating composition as recited in claim 6, wherein said amino acid comprises cysteine.

8. The aqueous coating composition as recited in claim 7, wherein said cysteine is present in an amount of 0.5% by weight.

9. The aqueous coating composition as recited in claim 1, wherein said coating composition has a pH of from 6 to 11.

10. The aqueous coating composition as recited in claim 1, wherein said source of ammonia comprises ammonium zirconyl carbonate.

11. The aqueous coating composition as recited in claim 1, wherein said coating composition further comprises vanadium pentoxide present in an amount of 0.5% by weight.

12. A method of coating a metal substrate comprising the steps of:
   a) providing a metal substrate;
   b) providing an aqueous coating composition comprising reaction products of a polymeric resin containing pendant beta-keto ester functions with an aldehyde and a source of either ammonia or a primary amine; wherein said polymeric resin comprises a plurality of polymeric chains and wherein each of said polymeric chains contains at least one of said pendant beta-keto ester functions; wherein said aldehyde is selected from the group consisting of formaldehyde, salicylaldehyde, cinnamaldehyde, vanillin, glyoxal, glyoxylic acid, and mixtures thereof; and wherein a portion of said polymeric chains are cross-linked to each other by a Hantzsch dihydropyridine reaction between two equivalents of said beta-keto ester functions, each of said beta-keto ester functions on a different polymeric chain, one equivalent of said aldehyde and one equivalent of said ammonia or said primary amine, thereby forming a plurality of polymeric chains each crosslinked to another polymeric chain by a Hantzsch dihydropyridine reaction; and
   c) applying the aqueous coating composition to the metal substrate and drying the aqueous coating composition in place on the metal substrate.

13. The method as recited in claim 12, wherein step c) comprises drying the aqueous coating composition at a peak metal temperature sufficient for the Hantzsch dihydropyridine reaction to proceed to sufficiently cross-link the polymeric chains to achieve a coating that is resistant to removal from the metal substrate by exposure to a 20% NaOH solution for 1 minute.

14. The method as recited in claim 12, wherein step c) comprises drying the aqueous coating composition at a peak metal temperature of from 82 to 177° C.

* * * * *